KEITH H. FULMER.
HAROLD B. SCHULTZ.
PAUL T. TUSZYNSKI.
INVENTORS

ATTORNEY.

United States Patent Office 3,183,670
Patented May 18, 1965

3,183,670
POWER BRAKE MEANS
Harold B. Schultz, Keith H. Fulmer, and Paul P. Tuszynski, South Bend, Ind., assignors to The Bendix Corporation, South Bend, Ind., a corporation of Delaware
Filed Oct. 3, 1963, Ser. No. 313,679
9 Claims. (Cl. 60—54.5)

This invention relates to a power brake system of the full hydraulic type.

In order to advance safety measures in present day automobiles the split braking system was developed whereby front and rear brakes are activated by independent hydraulic systems. It has been thought by some in the industry that present vacuum power assist means could be utilized with such split systems. However, as the more modern cars became more and more space conscious, the effective braking radius of a drum and/or disc brake is reduced. This has introduced a need for a brake actuator delivering high pressures with unlimited fluid displacement.

As those skilled in the art to which our invention relates no doubt realize, such a pressure displacement requirement as applied to present dry air and vacuum power units requires a growth in size of the power unit. This is not deemed advisable in view of the need for more passenger space and less equipment space of the modern day automobile.

Therefore, we are suggesting a full hydraulic power unit to eliminate space problems and provide high output pressures with unlimited displacement which power unit is simple to manufacture having fail-safe features adaptable to present day split braking systems.

It is another object of our invention to provide a full power control structure for a brake system.

A further object is to provide a split master cylinder control valve combination for power and no-power braking of a vehicle.

Still another object of our invention is to provide a combined split system master cylinder and full power control valve having minimum travel required to operate either.

A still further object is to provide a full power brake control mechanism with means to increase pedal travel upon power failure to provide for no-power braking.

Other and further objects and advantages of our invention will be realized by those skilled in the art from observing the following description of the drawings in which:

FIGURE 3 is a plan view along lines 3—3 of FIGURE 2 showing our valving controlling the range of travel allowed our combined master cylinder and power control valve.

Figure 1:
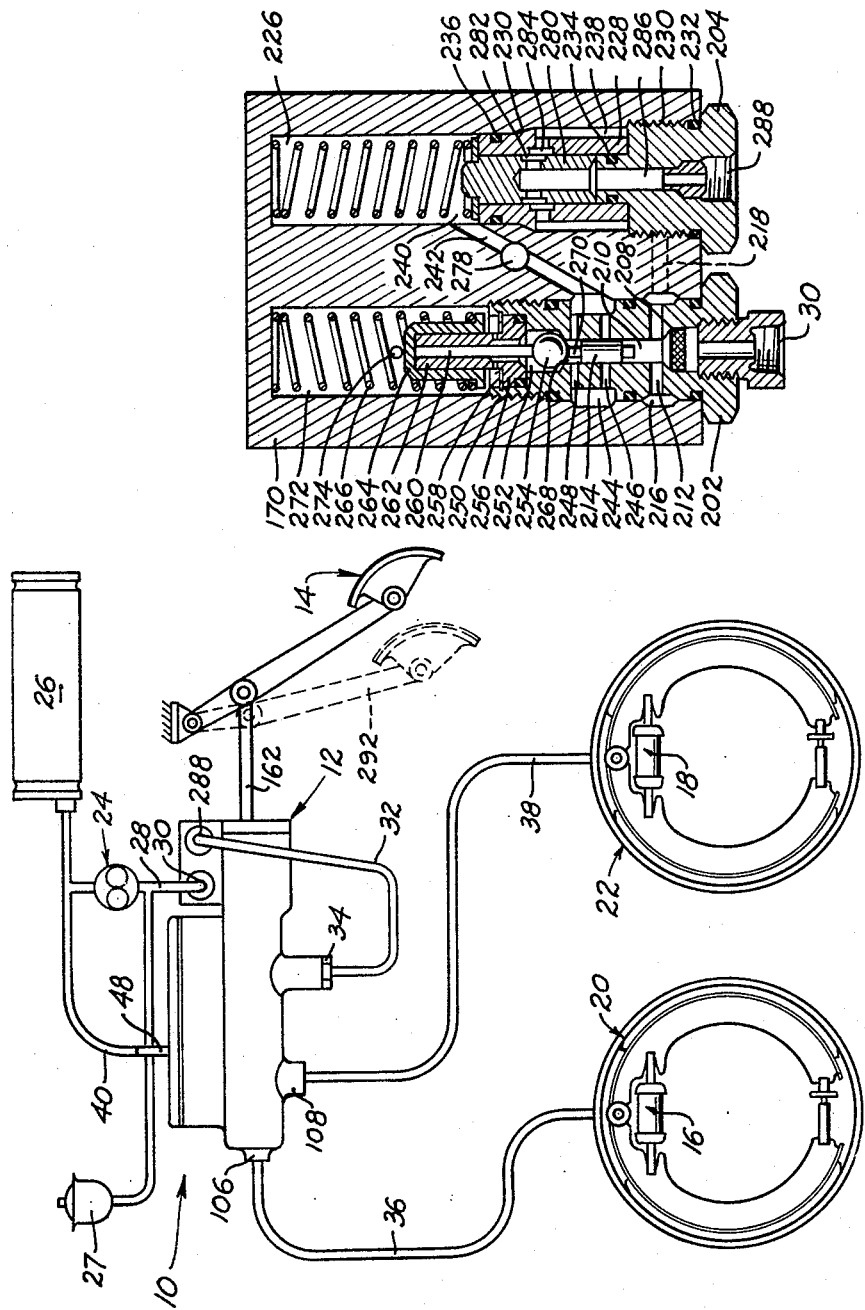
FIGURE 1 is a schematic of a braking system constructed in accordance with our invention.

In more detail, we show a full hydraulic power system 10 in FIGURE 1 that includes our master cylinder control valve assembly 12 operated by a brake pedal 14 to actuate, independently of each other, a pair of wheel cylinders 16 and 18 for a vehicle's rear and front brakes 20 and 22, respectively.

As seen, our power system also includes a pump 24, reservoir 26, and accumulator 27. As may be readily appreciated, the pump may be a variable displacement type or a constant displacement type with by-pass provisions. In any event the pump delivers fluid pressure on the order of 1700 to 1800 p.s.i. to a conduit 28 leading to an inlet 30 in the brake control mechanism 12. As will be further explained below the fluid pressure circulates through a travel control valve and out to a conduit 32 to a power section inlet 34. Then as the pedal 14 is depressed fluid is delivered to conduits 36 and 38 leading to the wheel cylinders 16 and 18, respectively. Upon release of the pedal 14 fluid flows back through brake unit 12 and via a conduit 40 to the reservoir 26.

Figure 2:
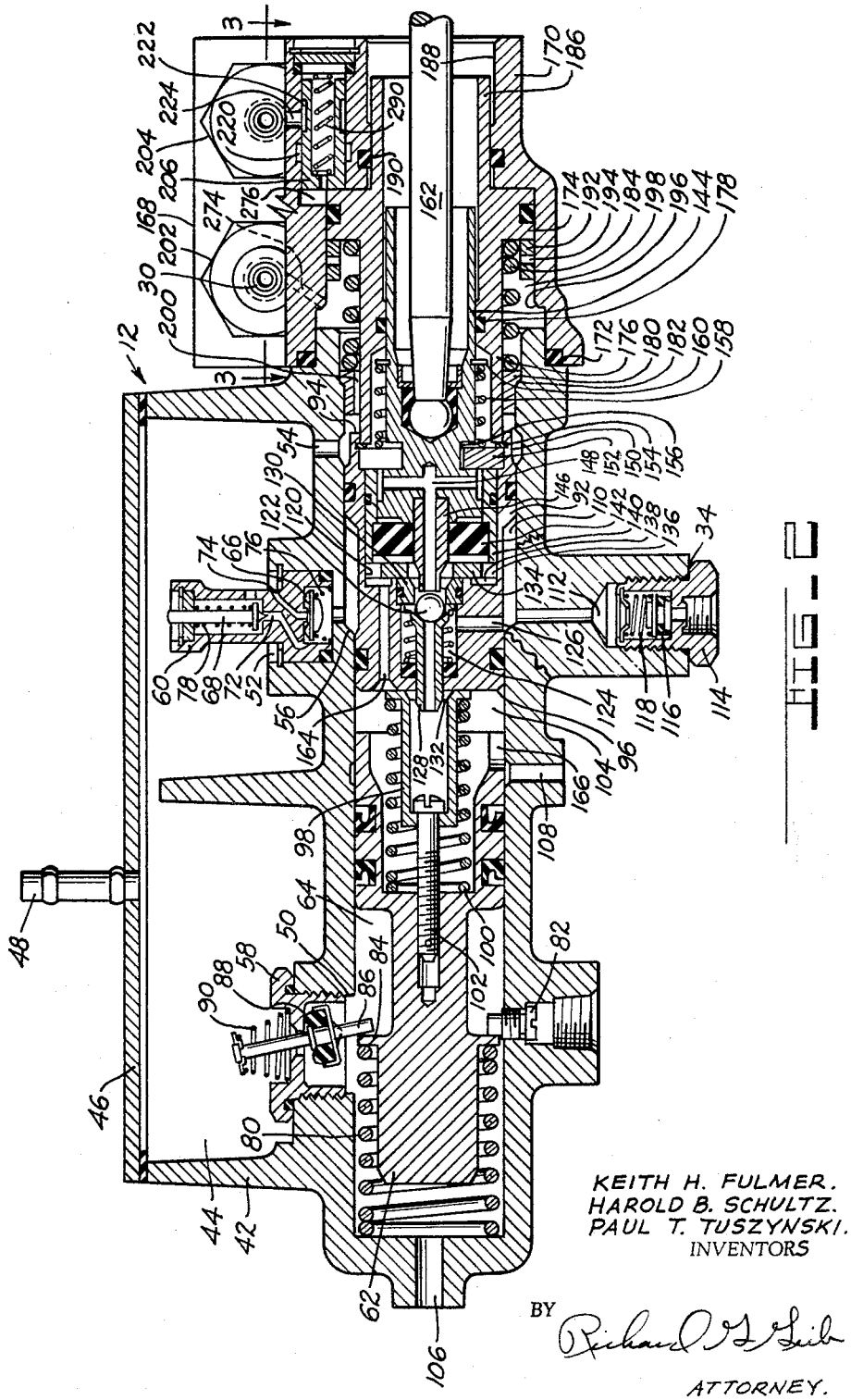
FIGURE 2 is a cross section showing a side view of a combined split system master cylinder and power valve arranged in accordance with our invention.

As to how the master cylinder power valve unit 12 is constructed, we direct your attention next to FIGURE 2 showing a housing 42 provided with a reservoir chamber 44 closed and sealed by a cover 46 having a tube 48 adapted therewith to connect the reservoir with conduit 40. The reservoir is provided with three drilled passages 50, 52 and 54 which communicate with a stepped bore 56 within the housing 42 under the reservoir. Of these passages, passages 50 and 52 are controlled by valves 58 and 60 that are sealingly mounted in said passages as by the fitting and the retaining ring shown.

Valve 58 is a spring biased tilt valve that cooperates with a front piston 62 and the bore 56 to control communication between the reservoir and a front variable volume chamber 64 as formed in said bore by piston 62. Valve 60 is a pressure responsive valve having a valve poppet 66 at its base and a needle valve 68 above the poppet valve with separate passages 72 and 74 communicating reservoir 44 to valve 66 and bore 56 to needle valve 68, respectively. As seen, both the poppet 66 and the needle valve 68 have springs 76 and 78, respectively, to bias their respective valves against seat means in the housing of valve 60.

As also is seen in FIGURE 2, the piston 62 is biased to the rear of the stepped bore 56 by a spring 80 to abutment with a stop 82 threaded through the housing 42. The stop 82 cooperates with a flange 84 of the piston 62, which flange 84 also cooperates with a trigger 86 of the tilt valve 58 to unseat a poppet 88 in opposition to a spring 90 of the valve 58. Thus, in the nonactuated position shown by FIGURE 2, the valve 58 is actuated to open communication of reservoir and chamber 64.

We have also provided a stepped piston 92 whose rear area 94 is greater than its frontal area 96. The front piston 62 is provided with a tubular spring retainer 98 that is extended by a spring 100 to a length permitted by an adjusting bolt 102. This extended length is determined by the rearmost position of the stepped piston 92 closing the stepped bore 56 in that the tubular retainer is arranged to abut the frontal area 94 of piston 92 to return same to the nonactuated position shown. Thus, a variable volume chamber 104 is formed between pistons 62 and 92.

The variable volume chambers 64 and 104 are provided with outlet ports 106 and 108, respectively. These outlets 106 and 108 are respectively connected to conduits 36 and 38 so that fluid pressure in these chambers may be communicated to respective wheel cylinders.

The stepped or rear piston 92 is arranged in the stepped bore 56 to provide an annular variable volume chamber 110 between the front and rear faces 96 and 94 of piston 92. The reservoir passage 52 opens into this chamber as well as an inlet passage 112. The inlet 112 is controlled by a unidirectional check valve fitting 114 having a valve poppet 116 biased by a spring 118 to permit inward flow only.

The piston 92 is bored and reamed to provide a stepped cavity 120 with the smaller, forward portion thereof being closed from the larger portion by a ball valve 122 to thereby establish a valve chamber 124 that is open to chamber 110 by a radial passage 126. The ball valve includes a stem 128 press fitted to ball 122, which stem protrudes through the front face 96 of piston 92, with the stem of a diameter equal to the seat diameter of the ball 122 as it seats on a ring 130 due to the force of a spring 132. As shown, the ring 130 is held in place by a washer 134 having peripheral cutouts 136. The washer is in turn held in a larger chamber 138 of the stepped cavity 120 by a ring 140 that mounts an annular disc 142 normally spaced from washer 134. The ring also slidably supports a valve operating member 144. The annular disc 142 abuts the member 144 and serves to support and locate a tubular projection 146 of the valve operating member to be aligned with the ball valve 122. As seen, the tubular projection 146 is sized to fit within the central opening of ring 130 so as to leave an annular passageway thereabout, and the valve operating member has an axially and radially drilled passageway 148 open to the inside of the tubular projection 150 about member 144 adjacent the rear face 94 of piston 92.

Just inside the cavity 120 adjacent the rear face 94 of piston 92 we have provided a C washer 152 that is held in abutment with the ring 140 by a retaining ring 154. This C washer serves to unite the piston 92 and valve operating member 144 by a lose fit with a groove 156 in the latter. This type of fit is really a lost motion connection which will allow sequential operation to open the ball valve 122 first and then permit manual actuation of the piston 92 without further loading the valve 122. Needless to say, the valve structure can be far less sturdy and simpler to manufacture with this type of operative connection. As may also be seen in FIGURE 2, the valve operating member 144 is biased by a spring 158 interposed with the C washer 152 and a ring 160 gripping the member 144 in a groove provided therefor. This acts to hold the member 144 in the position shown where the forward face of groove 156 abuts washer 152.

Thus, inward movement of member 144, as due to an inward force on a push rod 162 (connected to the brake pedal 14, as seen in FIGURE 1), will close reservoir communication and open the ball valve 122 allowing the flow past valve poppet 116 to flow out of the valve chamber 124 into the cavity 138, through the peripheral perforations 136 of washer 134 into an axial passage 164 into the chamber 104 between pistons 62 and 92, the former of which is slotted, as at 166, adjacent the outlet 108. Thus, the high pressure fluid will simultaneously flow out the chamber 104 and push the piston 62 forwardly closing tilt valve 58 to pressurize chamber 64 and cause pressure fluid to flow out outlet 106. This will independently actuate brakes 20 and 22 and, due to seal frictions and pressure buildup delay in chamber 104, cause some proportioning between brakes 20 and 22; whereupon the pressure buildup in brake cylinder 16 is lagging behind that supplied to cylinder 18. While this is not proportioning in view of the weight shift brought on by braking an automobile, it is helpful to the same extent in holding back the actuation of the rear brakes during the attendant weight shift.

One of the advantages of power braking systems is the small travel of the brake pedal for power brake actuation. However, it has been felt by a few people that in the event of power failure such small travel is dangerous in that not enough stroke is permitted to develop adequate foot power for brake actuation. As those readily skilled in the braking profession realize, this argument is not necessarily true with follow-through units of the above design. However, in order to dispel commentary that our design has stopped short of considering the so-called advantage of variable travel power brake actuation, we have incorporated a brake pedal pop-up control to our aforementioned power brake control means 12.

More particularly, we have added a pop-up actuator 168 to the housing 42 adjacent the end through which the valve operating member protrudes, as by bolting the actuator 168 thereto. If desired the actuator housing 170 could be cast with or otherwise formed with housing 42 to thereby save the need of a seal 172 between housings 42 and 170, as shown.

This actuator is constructed with a piston 174 concentrically arranged with the push rod 162 and member 144 and adapted to sealingly slide along the outer surface of valve operating member 144 due to a tubular projection 176 and seal 178. In addition, projection 176 is supported by a guide bearing 180 held in the opening of bore 56 by being biased against a shoulder 182 of housing 42 by a spring 184 interposed with the bearing 180 and the piston 174. The piston 174 is supported to the rear by another tubular portion 186 to reciprocate along a bore 188 of housing 170 having a seal 190 to prevent fluid leakage.

While it has not heretofore been discussed, the pistons 62 and 92 and valve stem 128 plus ring 140 are provided with appropriate seals as shown to isolate certain areas one from another as is within the skill of the art.

In getting back to the pop-up actuator we have provided a spacer ring 192 to allow for a larger spring 184 insuring adequate return of piston 174 under conditions hereinafter explained. This spacer ring 192 is drilled as at 194 to allow fluid communication between a space formed by a groove 196 in housing 170 and the variable volume chamber 198 ahead of piston 174 when the ring 192 abuts the face of housing 42 separating the space and chamber. Moreover, the guide bearing 180 is drilled at spaced intervals or cut out as at 200 to communicate the variable volume chamber 198 to the reservoir opening 54.

The housing 170 is also provided with a pressure responsive valve 202 and a pressure regulating valve 204 in series with a mechanically controlled shut-off slide valve 206 and said pressure responsive valve 202.

Referring back to FIGURE 1, the pump 24 delivers pressurized fluid to the pressure responsive valve 202 at inlet 30 (see FIGURE 3) from whence it passes through a filter screen 208 to a valve chamber 210 where it simultaneously flows outwardly through radial passages 212 and acts on a shuttle valve 214. The passages 212 open into an annular space 216 that is connected by a passage 218 (shown in phantom in FIGURE 3) to an annular groove 220 (see FIGURE 2) overlying the slide valve 206. As seen, the slide valve is provided with a wide groove 222 that will overlap both groove 220 and a radial opening 224 in housing 170 that communicates with a chamber 226 about the pressure regulator valve 204 (see FIGURE 3).

As seen the valve 204 includes a sleeve 228 held against a shoulder by a threaded portion 230. Seals 232, 234 and 236 are provided in such joinder of the valve 204 to housing 170 to seal off a portion 238 of chamber 226 open to passage 224 from a portion 240 open by way of an angled passage 242 to a chamber 244 about valve 202, such that the passage 242 will receive fluid from either of a pair of radial passages 246 and 248 in the valve body 202 controlled by the shuttle 214. For purposes of illustrating a form of construction only we show valve body 202 as an integral unit having a threaded connection 250 with the housing 170.

The valve body 202 is provided with a cavity 252 within which a ball 254 is contained by an annular ring 256 held to close the cavity 252 by a retaining ring 258 fitting a groove in body 202. A rod 260 held by a collar 262 in a spring bearing section 264 is biased by a spring 266 to seat ball 254 over the opening 268 in the valve chamber 210 behind shuttle 214. As seen, however, the ear 270 of the shuttle is holding the ball 254 away from the opening to allow fluid communication of chamber 272 with the passages 248 and 242 to chamber 240. The chamber 272 is drilled, as at 274, on an angle (see FIGURE 2, shown in phantom) to communicate with the chamber 198 and by passage 200 and 54 with the reservoir 44. The passage 242 is opened to a chamber 276 (see FIGURE 2) by a vertical passage 278.

Within the pressure regulating valve sleeve 228 we slidably arrange a spool valve 280 having radial opening 282 in partial registry with side openings 284 in sleeve 228 to restrictively communicate the chamber 238 with an axial passage 286 leading to an outlet 288 that is connected with conduit 32 (see FIGURE 1).

In operation our pop-up actuator receives fluid pressure from pump 24 to cause shuttle 214 to open passage 246 to chamber 244 and thence to chambers 226 and 276. At the same time fluid is flowing through passages 212 and 218. The fluid pressure in chamber 276 causes piston 174 to move inwardly and cause the piston 92 to abut on piston 62 at which time piston 174 has caused ring 192 to bottom on the face of housing 42. This allows a spring 290 to project slide valve 206 to communicate groove 220 and passage 224 in housing 170. Fluid then flows through the restriction caused by partial overlap of passages 282 and 284 out through the regulator 204 into conduit 32 and to the pressure check valve fitting 114 of the power section inlet 34.

In the event of a power failure the shuttle 214 will open the chamber 276 to reservoir pressure via chambers 272 and 198 and appropriate passages. This allows spring 184 to return piston 174 to abut valve 206 and shut off communication of groove 220 and passage 224 to prevent or block further fluid pressure from being supplied to the inlet. Thus, the brake pedal is raised from the low travel position 292 (shown in phantom in FIGURE 1) to the high position shown by the solid lines of FIGURE 1.

However, during the return of the piston 174 and the raising of the pedal 14 to its high travel position shown, the pressure regulator will further close the opening between passages 282 and 284 to progressively decrease the available pressure to the power unit inlet 34. This is due to the pressure differential across the valve due to sudden porting of the chamber 240 to reservoir.

We should also like to add that the pressure relief needle valve 68 will permit the lowering of pedal 14 by venting excess pressure in chamber 110 tending to oppose same.

Upon release of the brake pedal 14 the tubular portion will spring off the ball valve 122 which closes on the seat of ring 130. Fluid in the front brake system then will flow through passages 148 and 54 to the reservoir, and with a closed system shown, into the pump reservoir.

The foregoing is intended to illustrate but one form in which our invention may be found, and no doubt is expressed as to the possibility of other constructions which embody our contributions. Therefore, we maintain that the true scope of our invention is set forth by the appended claims.

We claim:
1. In a split braking system for a vehicle having a fluid pressurizing system, a combined master cylinder and power control valve comprising:
   (1) a housing having a bore therein with a fluid inlet port, at least two fluid pressure delivery ports and a reservoir port;
   (2) a first piston slidably mounted in said bore adjacent the rear of said bore;
   (3) a second piston slidably mounted in said bore to the front thereof ahead of said first piston, said second piston being operatively connected to said first piston;
   (4) a control valve operatively connected to said first piston to control passage of a fluid through passages in said first piston and out to one of said fluid pressure delivery ports, while simultaneously moving said second piston to deliver fluid from the other of said fluid pressure delivery ports; and
   (5) means operatively connected to said valve and said first piston to permit opening of said valve first and movement of said second piston after said valve has been fully opened and further force is applied to said means.

2. In a split braking system for a vehicle having a fluid pressurizing system, a combined master cylinder and power control valve comprising:
   (1) a housing having a stepped bore therein with a fluid inlet port, two fluid pressure delivery ports and a pair of reservoir ports;
   (2) a first piston slidably mounted within said bore adjacent the rear of said bore, said piston having a large diameter rear face and a smaller diameter front face to form an annular variable volume chamber between said faces in the area of the stepped portion of said bore;
   (3) a second piston slidably mounted in said bore ahead of said front face of said first piston, said second piston being operatively connected to said first piston to create a first variable volume chamber between said piston and a second variable volume chamber ahead of said second piston;
   (4) a control valve operatively mounted in said first piston to control passage of a fluid through passages in said first piston to said first variable volume chamber from whence it is exhausted through one of said fluid pressure delivery ports, said fluid in said first variable volume chamber simultaneously acting on said second piston to pressurize a fluid in said second variable volume chamber and deliver same via the other of said fluid pressure delivery ports; and
   (5) means operatively connected to said valve and said first piston to permit opening of said valve first and movement of said first piston thereafter when said valve has been fully opened and further force is applied to said means.

3. A combined master cylinder and power control valve according to claim 2 and further comprising reservoir port control means operatively connected to said pistons for compensating fluid loss in said split braking system independently of each other.

4. A combined master cylinder and power control valve according to claim 2 and further comprising a pressure release valve for said annular chamber whereupon said first piston may be moved inwardly toward said second piston in order to provide a low pedal position for power brake actuation and a raised pedal position for increased displacement under no power operation.

5. A combined master cylinder and power control valve according to claim 2 and further comprising a reservoir portion overlying said reservoir ports and formed with said housing.

6. A power braking system comprising a first reservoir for a hydraulic fluid;
   (1) a pump means for pressurizing the fluid of said reservoir, said pump means being in fluid communication with said reservoir;
   (2) a combined master cylinder and power control valve adapted to receive the fluid from said pump, said combined master cylinder and power control valve including,
      (a) a housing having a reservoir cavity overlying a stepped bore with a fluid inlet port leading into said larger portion of said stepped bore and two fluid pressure delivery ports exhausting the smaller portion of said stepped bore at spaced intervals and a plurality of reservoir ports communicating said stepped bore to said reservoir cavity at spaced intervals,
      (b) a first piston slidably mounted in said bore adjacent the rear of said bore, said first piston having a large diameter rear face and a smaller diameter front face to form an annular variable volume chamber between said faces in the area of the stepped portion of said bore,
      (c) a second piston slidably mounted in said bore to the front thereof ahead of the front face of said first piston, said second piston being operatively connected to said first piston to create a first variable volume chamber between said pistons and a second variable volume chamber ahead of said second piston,
      (d) a control valve operatively mounted in said first piston to control passage of a fluid through passages in said first piston and out to said first variable volume chamber to cause said second piston to pressurize a fluid in said second variable volume chamber, which fluids are delivered by said outlet ports, and (e) means operatively connected to said valve and said first piston to permit opening of said valve first and movement of said first piston thereafter when said valve has been fully opened and further force is applied to said means;

(3) a brake pedal operatively connected to said valve and said piston; and (4) a first and second brake means independently connected to said fluid delivery ports.

7. A combined master cylinder and power control valve according to claim 1 and further comprising a pop-up actuator operatively connected to both said first piston and said means operatively connecting said valve and said first piston to regulate the permissible travel of said means from a minimum to a maximum under power and no-power conditions, respectively.

8. A combined master cylinder and power control valve according to claim 2 and further comprising a pop-up actuator operatively connected to both said first piston and said means operatively connecting said valve and said first piston to regulate the permissible travel of said means from a minimum to a maximum under power and no-power conditions, which actuator includes a valve device controlling fluid communication to said fluid inlet port of said stepped bore to trap pressure in said annular variable volume chamber opposing said pop-up actuator to aid in bringing about the transition from minimum to maximum travel for said means.

9. A power braking system according to claim 6 and further comprising a pop-up actuator in abutment with said first piston and connected by a spring to said means operatively connecting said valve and said first piston to regulate the permissible travel of said means from a minimum to a maximum under power and no-power conditions, respectively.

References Cited by the Examiner
UNITED STATES PATENTS

| | | | |
|---|---|---|---|
| 2,858,911 | 11/58 | Price | 60—54.5 |
| 2,992,533 | 7/61 | Hodkinson | 60—54.6 |

JULIUS E. WEST, *Primary Examiner.*

EDGAR W. GEOGHEGAN, *Examiner.*